E. A. DOTY.
NUT LOCK.
APPLICATION FILED FEB. 28, 1919.

1,361,838.

Patented Dec. 14, 1920.

Inventor
Edwin A. Doty
by Geyer & Popp
Attorneys

UNITED STATES PATENT OFFICE.

EDWIN A. DOTY, OF ALBANY, NEW YORK.

NUT-LOCK.

1,361,838.  Specification of Letters Patent.  Patented Dec. 14, 1920.

Application filed February 28, 1919. Serial No. 279,677.

*To all whom it may concern:*

Be it known that I, EDWIN A. DOTY, a citizen of the United States, residing in Albany, in the county of Albany and State of New York, have invented new and useful Improvements in Nut-Locks, of which the following is a specification.

This invention relates to a nut lock which is capable of being applied to bolts and nuts of ordinary construction, and thus permit of universal use of the same.

It is the object of this invention to provide a nut lock of this type which can be produced at very low cost, which will effectively hold the nut and bolt against turning with reference to each other, which can be very easily and quickly applied without requiring special tools for this purpose, and which will also permit of tightening the nut on the bolt when the same becomes loose and also enables the nut to be easily removed when required.

Figure 5:
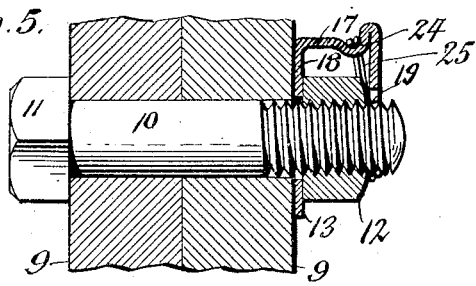
Figure 6:
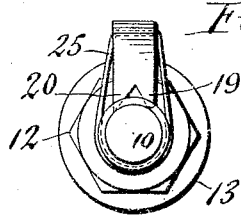
Figure 1:
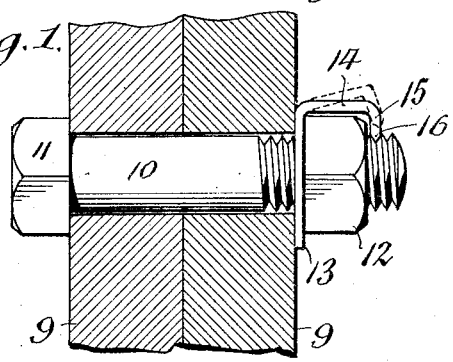
Figure 3:
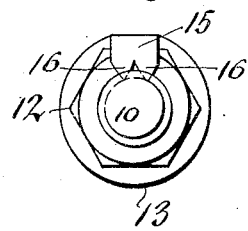
Figure 2:
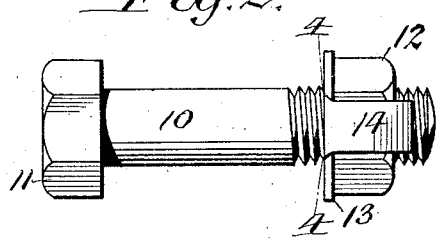
Figure 4:
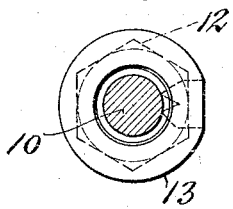
Figure 7:
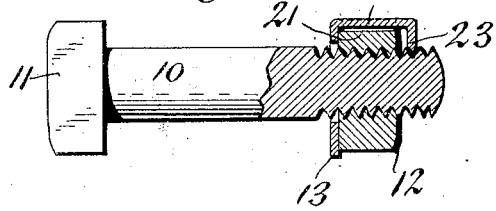
Figure 8:
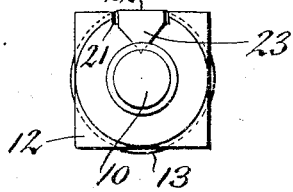

In the accompanying drawings:

Figure 1 is a side elevation of a nut and bolt applied to two members which are connected and equipped with one form of my improved nut lock. Fig. 2 is a plan view of the same. Fig. 3 is an end view thereof. Fig. 4 is a cross section taken on line 4—4, Fig. 2. Fig. 5 is a sectional elevation of a nut and bolt and two members connected thereby equipped with another form of my invention. Fig. 6 is an end view of the same. Fig. 7 is a sectional elevation of a nut and bolt equipped with still another form of my invention. Fig. 8 is an end elevation of the same.

Similar characters of reference refer to like parts throughout the several views.

Referring to the construction shown in Figs. 1-4, 9, 9 represent two plates, parts, or members which are connected by a bolt and nut of ordinary construction, this bolt as shown consisting of a shank 10 passing through corresponding openings in said members, a head 11 arranged at one end of the shank and bearing against the outer side of one of said members, and a nut 12 engaging its internal thread with the external thread on the opposite end of said shank.

The nut lock containing my invention and shown in these views comprises a flat perforated body or washer 13 which is arranged between the rear end of the nut and the outer side of the adjacent member and receiving the adjacent part of the bolt shank, a supporting arm 14 arranged lengthwise adjacent to one of the lateral sides of the nut and connected at its rear end with the adjacent edge portion of the washer, a lip 15 projecting inwardly from the front end of the arm along the front side of the nut, and two spurs or prongs 16, 16 arranged side by side and engaging with the adjacent thread of the bolt shank. The washer, supporting arm, lip and spurs are preferably constructed from a single sheet of metal, such as spring steel, by means of stamping or otherwise.

When using this nut lock in connection with a bolt and nut for tying two parts or members together, the nut is tightened upon the bolt with the washer of the nut lock interposed between the rear end of the nut and the front side of the adjacent member which is to be connected to another while the supporting arm is deflected outwardly from the lateral side of the nut, so that the spurs do not engage with the thread of the bolt shank, as shown by dotted lines in Fig. 1. After the nut has been properly tightened, the supporting arm is pressed inwardly by the blow of a hammer or otherwise, so that the spurs engage with the adjacent thread of the bolt shank, as shown by full lines in Figs. 1 and 2, whereby the spurs are caused to embed themselves sufficiently into the metal of the bolt shank to prevent the same from turning and thereby prevent the nut from becoming loose on the bolt shank.

If at any time it becomes necessary to tighten the nut or to remove the same from the bolt shank, this can be readily done by placing a screw driver, chisel or the like between the nut and the supporting arm and then prying the latter away from the nut sufficiently to disengage the spurs or prongs from the thread of the bolt shank. After this the nut can be either tightened more fully and the nut lock reëngaged with the bolt shank, or the nut may be wholly removed from the bolt shank with ease and facility without interference from the nut lock.

As an additional means for holding the spurs 19, 20 sufficiently firm in engagement with the thread of the bolt shank a wire tie 25 may be wound around the front part of the supporting arm 17 and the threaded front part of the bolt shank, as shown in Figs. 5 and 6. In order to confine this tie on the supporting arm and prevent the same from slipping off forwardly therefrom the upper side of this arm is provided with an inward depression or seat 24 which receives the upper turn of this tie, as shown in Fig. 5.

In the construction shown in Figs. 1-4, the supporting arm extends directly forward from an edge portion of the washer and the spurs of the lip are both of the same construction, which causes the supporting arm to lie comparatively close to the side of the nut and prevents the same from turning and the bolt shank receives two indentations from the spurs.

If desired, the supporting arm may be arranged a considerable distance from the lateral side of the nut, so as to permit of more readily turning the same if this is desirable, by means of an ordinary wrench while the spurs are still in engagement with the thread of the bolt shank. Such a construction is shown in Figs. 5 and 6, and in this form of my improved nut lock the rear end of the supporting arm 17 is connected with the adjacent edge portion of the washer 13 by means of a transverse web 18 which for economy and simplicity of construction may be stamped in one piece with the washer, supporting arm and associated parts of the nut lock. In this last mentioned construction, the front or advancing spur 19 of the pair may be made dull at its end while the rear or trailing spur 20 may be made sharp. When spurs of this character are engaged with the adjacent thread of the bolt shank by means of a hammer blow, the front spur does not embed itself into the metal of the supporting shank but only rests against the same while the rear spur actually digs into the metal of the bolt shank and forms an interlock therewith which prevents these parts from turning relatively to each other. This last mentioned construction however permits the nut and bolt shank to be tightened relatively to each other but prevents backward movement, which would tend to loosen these parts.

If desired, the supporting arm of the nut lock may be positively interlocked with the nut so that these two parts when in their operative position relatively to each other are prevented from turning about the axis of the bolt independently of each other. Such a construction is shown in Figs. 7 and 8, and as there shown the lateral side of the nut is provided with a notch or recess 21 in which the supporting arm 22 is arranged when in its operative position. This last mentioned construction also differs from those shown in the preceding figures by the employment of only a single spur 23 for engagement with the adjacent thread of the bolt shank instead of two spurs, as shown in Figs. 1-6.

Owing to the simplicity of the construction of this nut lock, the same can be produced at very low cost and inasmuch as the same is constructed from a single sheet of metal, it has no parts which are liable to get out of order, and the same can be very quickly applied to bolts without any loss of time and without requiring any special tools for this purpose.

I claim as my invention:

1. A nut lock comprising a washer adapted to receive the shank of a bolt and engage with the rear side of a nut on the shank, a supporting arm projecting forwardly from said washer, a spur mounted on the front end of said arm and engaging with the thread of said shank, and a tie passing around the front parts of said arm and bolt shank.

2. A nut lock comprising a washer adapted to receive the shank of a bolt and engage with the rear side of a nut on the shank, a supporting arm projecting forwardly from said washer, a spur mounted on the front end of said arm and engaging with the thread of said shank, and a tie passing around the front parts of said arm and bolt shank, the front part of said arm being provided with a seat or depression which receives said tie.

EDWIN A. DOTY.